(12) United States Patent
Chandrasekhar et al.

(10) Patent No.: US 11,341,053 B2
(45) Date of Patent: May 24, 2022

(54) VIRTUAL MEDIA PERFORMANCE IMPROVEMENT

(71) Applicant: Dell Products L.P., Round Rock, TX (US)

(72) Inventors: Babu Krishna Chandrasekhar, Round Rock, TX (US); Jitendra Kumar, Bangalore (IN); Rajeshkumar Ichchhubhai Patel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 16/925,991

(22) Filed: Jul. 10, 2020

(65) Prior Publication Data
US 2021/0303472 A1    Sep. 30, 2021

(30) Foreign Application Priority Data
Mar. 28, 2020  (IN) .............................. 202011013695

(51) Int. Cl.
| | |
|---|---|
| *G06F 12/08* | (2016.01) |
| *G06F 16/18* | (2019.01) |
| *G06F 16/17* | (2019.01) |
| *G06F 13/42* | (2006.01) |
| *G06F 12/0866* | (2016.01) |
| *G06F 16/188* | (2019.01) |
| *G06F 16/172* | (2019.01) |

(52) U.S. Cl.
CPC ...... *G06F 12/0866* (2013.01); *G06F 13/4282* (2013.01); *G06F 16/172* (2019.01); *G06F 16/188* (2019.01); *G06F 2212/603* (2013.01); *G06F 2213/0042* (2013.01)

(58) Field of Classification Search
CPC .. G06F 12/0866; G06F 16/188; G06F 16/172; G06F 13/4282; G06F 2212/603; G06F 2213/0042
USPC .......................................................... 711/126
See application file for complete search history.

(56) References Cited

U.S. PATENT DOCUMENTS

| | | | |
|---|---|---|---|
| 2006/0149898 A1* | 7/2006 | Bello ..................... | G06F 3/0686 711/111 |
| 2008/0168118 A1* | 7/2008 | Hickey .................. | G06F 13/385 709/201 |
| 2009/0300020 A1* | 12/2009 | Chen .................... | G06F 21/6218 |
| 2010/0129057 A1* | 5/2010 | Kulkarni ................ | H04N 5/765 386/241 |
| 2011/0145494 A1* | 6/2011 | Mitsuma ............. | G06F 12/0866 711/111 |
| 2011/0238929 A1* | 9/2011 | Itoh ........................ | G06F 3/0686 711/154 |

(Continued)

*Primary Examiner* — Christopher B Shin
(74) *Attorney, Agent, or Firm* — Jackson Walker L.L.P.

(57) ABSTRACT

An information handling system may include a host system and a management controller configured to provide out-of-band management of the information handling system. The management controller may be configured to: receive, from a management console, a request to establish virtual media for the host system; cause the requested virtual media to be mounted as a drive accessible to the host system; receive read requests from the host system for data associated with the mounted drive; and cache data from the virtual media in a local cache such that at least some of the read requests from the host system are serviceable via the local cache instead of via a network request to the management console.

18 Claims, 3 Drawing Sheets

(56) References Cited

U.S. PATENT DOCUMENTS

| | | | |
|---|---|---|---|
| 2013/0054882 A1* | 2/2013 | Ryu | G06F 12/0866 |
| | | | 711/103 |
| 2016/0085472 A1* | 3/2016 | Takeuchi | G06F 3/0611 |
| | | | 711/154 |
| 2017/0104840 A1* | 4/2017 | Spagnola | H04L 67/2852 |
| 2018/0173878 A1* | 6/2018 | Kurjanowicz | G06F 21/53 |
| 2020/0326998 A1* | 10/2020 | Chandrasekhar | G06F 9/543 |
| 2020/0356389 A1* | 11/2020 | Chandrasekhar | G06F 13/107 |
| 2020/0356478 A1* | 11/2020 | Gupta | G06F 12/0897 |

* cited by examiner

VIRTUAL MEDIA PERFORMANCE IMPROVEMENT

TECHNICAL FIELD

The present disclosure relates in general to information handling systems, and more particularly to performance improvements in the handling of virtual media.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Management controllers may provide a facility for remotely mounting virtual media, which typically takes the form of establishing a virtual drive at a host system based on a remote image file such as an ISO or IMG file. For example, a user at a management console may use a web browser or other means to connect to a management controller of a host information handling system. The user may then cause an image file that is local to the management console to be mounted as a virtual local drive (e.g., a USB drive) at the host information handling system. In some instances, the virtual drive may be bootable, and the host may execute its boot routines.

The read and/or write performance of such virtual drives, however, is a concern. Typically, each block of data that the information handling system accesses must be transferred over the network, which may be significantly slower than a real local drive would be. Accordingly, embodiments of this disclosure may provide caching mechanisms to improve the performance of such virtual media.

Existing virtual media solutions typically lack any caching, because virtual media is handled by a management controller, which may act as a simple pass-through between the host and the management console client.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with virtual media performance may be reduced or eliminated.

In accordance with embodiments of the present disclosure, an information handling system include a host system and a management controller configured to provide out-of-band management of the information handling system. The management controller may be configured to: receive, from a management console, a request to establish virtual media for the host system; cause the requested virtual media to be mounted as a drive accessible to the host system; receive read requests from the host system for data associated with the mounted drive; and cache data from the virtual media in a local cache such that at least some of the read requests from the host system are serviceable via the local cache instead of via a network request to the management console.

In accordance with these and other embodiments of the present disclosure, a method may include, in an information handling system comprising a host system and a management controller configured to provide out-of-band management of the information handling system: the management controller receiving, from a management console, a request to establish virtual media for the host system; the management controller causing the requested virtual media to be mounted as a drive accessible to the host system; the management controller receiving read requests from the host system for data associated with the mounted drive; the management controller caching data from the virtual media in a local cache; and the management controller servicing at least some of the read requests from the host system via the local cache instead of via a network request to the management console.

In accordance with these and other embodiments of the present disclosure, an article of manufacture may include a non-transitory, computer-readable medium having computer-executable code thereon that is executable by at least one processor of a management controller of an information handling system for: receiving, from a management console, a request to establish virtual media for a host system of the information handling system; causing the requested virtual media to be mounted as a drive accessible to the host system; receiving read requests from the host system for data associated with the mounted drive; caching data from the virtual media in a local cache; and servicing at least some of the read requests from the host system via the local cache instead of via a network request to the management console.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
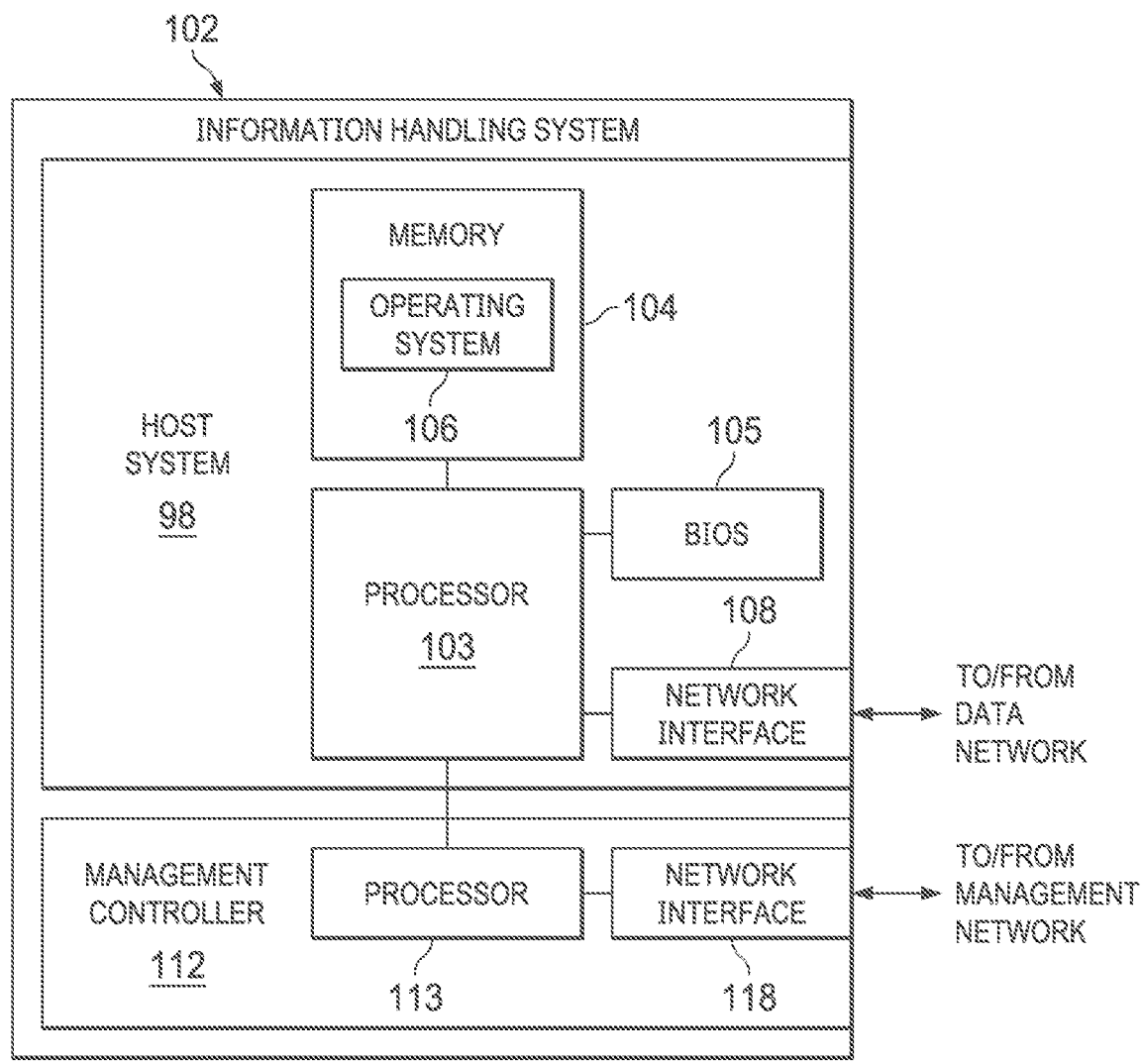
FIG. 1 illustrates a block diagram of an example information handling system, in accordance with embodiments of the present disclosure.
Figure 2:
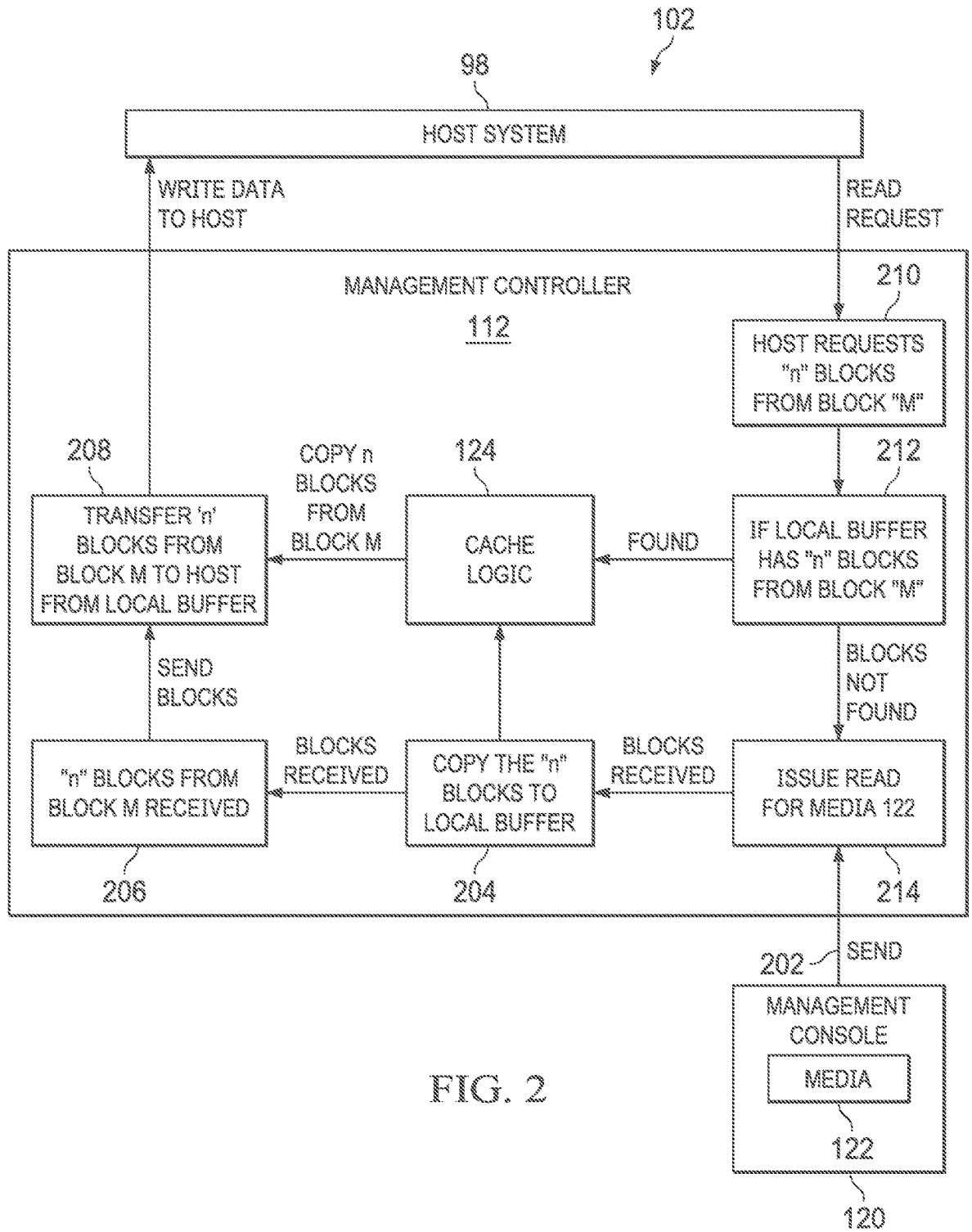
FIG. 2 illustrates a functional block diagram, in accordance with embodiments of the present disclosure.
Figure 3:
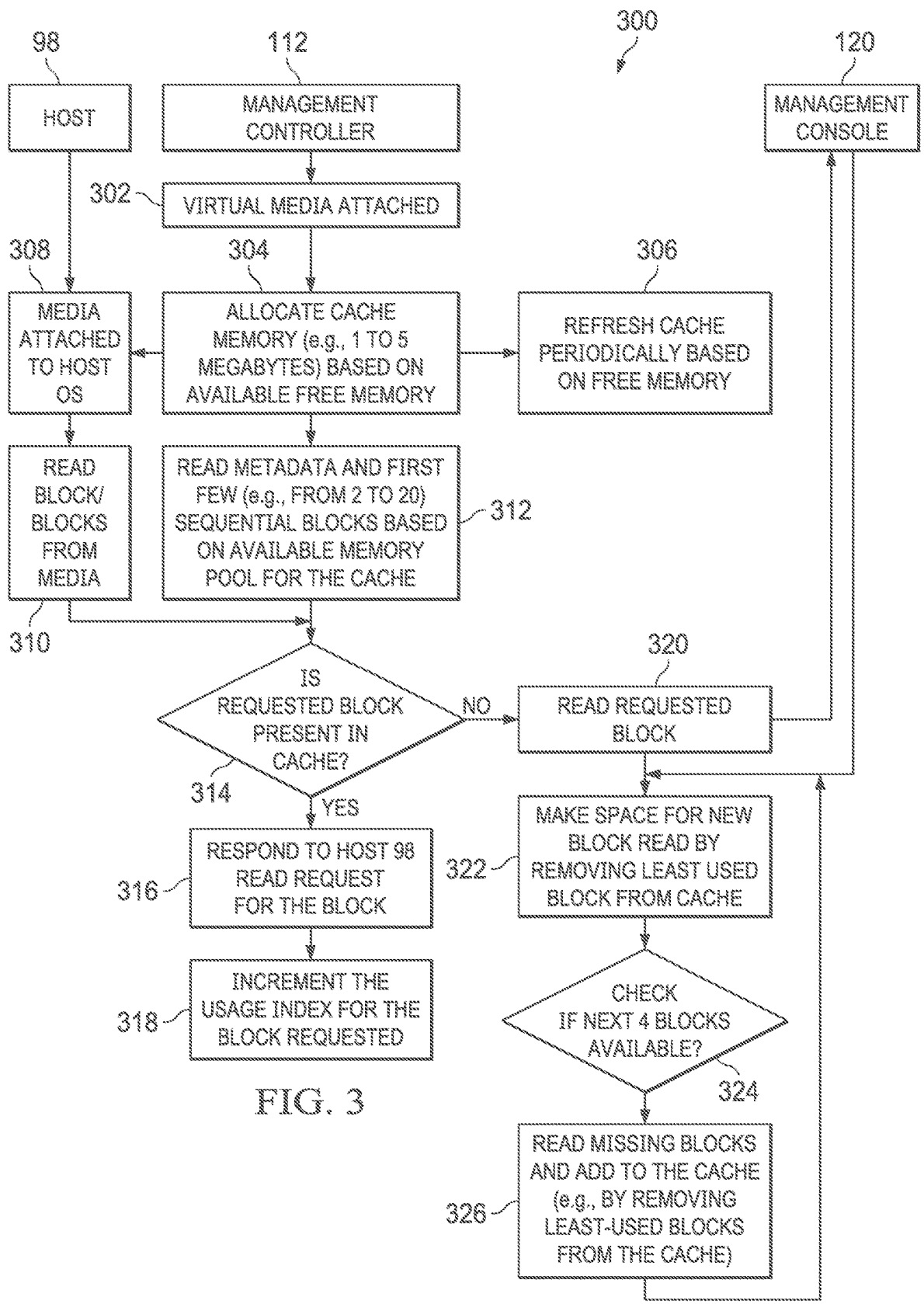
FIG. 3 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

For the purposes of this disclosure, the terms "console" and "management console" may be used interchangeably to refer broadly to systems that are configured to couple to a management controller and issue management instructions for an information handling system that is being managed by the management controller. One example of such a console is the Dell OpenManage Essentials systems management console. In various embodiments, management consoles may be implemented via specialized hardware and/or via software running on a standard information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Management controller 112 may also be coupled (e.g., via network interface 118 and the management network) to a management console 120 (shown in FIG. 2).

As discussed above, management controllers such as management controller 112 implementing virtual media services typically act as a pass-through for virtual media packets passing between a management console and a host system. That is, the management controller typically does not examine or operate on such packets.

In the past, management controllers lacked sufficient processing and/or memory resources to perform such extra packet processing, and so they might read the same packets (or blocks) many times from the management console whenever the host requested them. This type of implementation without any caching provides a virtual media solution with no additional local memory commitment from the management controller.

In practice, however, in a given image file there are typically some frequently accessed blocks such as volume descriptors, directory descriptors, file descriptors, path tables, etc. A management controller may examine the first few bytes of a logical block of data and determine if it is such a volume descriptor, etc. The majority of the use cases for virtual media are to install operating system files, and so the file structure is typically a standard ISO, allowing for such examination. In other embodiments, other filesystems or file formats may also give rise to predictable regions that are likely to be frequently accessed. Accordingly, it may be advantageous for a cache system to include filesystem-specific information for various types of virtual media, allowing for intelligent caching of such information.

Turning now to FIG. 2, a functional block diagram of system 102 is shown. For purposes of clarity and exposition, some elements shown in FIG. 1 have been omitted from the view shown in FIG. 2. Further, some elements omitted from FIG. 1 have been illustrated in FIG. 2 in order to point out their functionality.

Management console 120 may have media 122 accessible to it. For example, media 122 may be a disc image such as an ISO or IMG file on a local storage medium. In other embodiments, media 122 may reside elsewhere (e.g., on a remote storage medium accessible via a network). In yet other embodiments, rather than a disc image, media 122 may comprise a physical storage medium such as a CD or DVD that is to be made available as virtual media to host system 98.

At step 202, management console 120 may send data from media 122 to management controller 112. As shown, this may be in response to a read request issued by management controller 112 at step 214. In some embodiments, such a read request may have originated at host system 98. In other embodiments, the sending may be in response to a command from a user of management console 120.

Assuming the read request is for n blocks of data starting from Block M of media 122, at step 204, management controller 112 may copy those n blocks of data from media 122 into cache logic 124.

At steps 206 and 208, those n blocks may also be sent to host system 98 as requested.

In the course of other ensuing read requests from host system 98, host system 98 may eventually request those same n blocks again at step 210.

At step 212, management controller 112 may check cache logic 124 to see if the n blocks are still resident in the cache. If not, the method may return to step 214, and management controller 112 may issue a read request for the blocks.

If the blocks are resident in the cache, however, management controller may service the read request by transferring them from cache logic 124 to host system 98, reducing the amount of time and network traffic required for servicing the request. If management controller 112 can cache frequently used blocks/packets, the overall read performance will be significantly improved.

In some embodiments, management controller 112 may maintain state variables to track the attach/detach and connect/disconnect status of management console 120's connection to media 122. Further, in some embodiments management controller 112 may eventually discard the cached data when it detects a detach or disconnect event from management console 120 indicating that media 122 is no longer present, or when it detects that management console 120 has disconnected from its management session.

In some embodiments, a data structure consisting of a block index, a usage count, and the actual block of data may be employed by cache logic 124. Every time a new block of data is accessed, management controller 112 may add it to the cache data if it is a special block (e.g., volume descriptor, etc.) that is likely to be accessed frequently. Further, based on memory availability, management controller may also save ordinary (non-special) blocks of data as they are accessed. Cache logic 124 may thus in some embodiments include information regarding the filesystem of media 122, allowing it to intelligently cache the special blocks preferentially to the non-special blocks.

In other embodiments (e.g., embodiments with an excess of available memory) the entirety of the data may be cached.

In some embodiments, cache logic 124 may include a mechanism for incrementing a usage index for a block of data if the same block of data is accessed again by host system 98. The usage index variable may be maintained so that management controller 112 can free up less frequently used cache if needed, so that most frequently used data is always available in the cache. One of ordinary skill in the art with the benefit of this disclosure will readily understand that any of various types of data structures can be used by cache logic 124 in any particular embodiment. For example, an array with sorting logic may be used, or a binary tree balanced based on usage index.

In some embodiments, caching may be combined with reading sectors ahead to provide an even larger performance boost. For large files, sectors/blocks are arranged in sequential order, and the time required to read new blocks may be reduced due to such reading ahead and increasing the chances of finding the required data in cache memory.

In some embodiments, management controller 112 may include free memory monitoring to provide data on available free memory. If the available free memory falls below a certain threshold, the cache logic 124 may free up memory consumed for the block cache. This will ensure that the caching solution is not causing other processes running on management controller 112 to be starved of memory.

In some embodiments, cache logic 124 may be inserted as a shim layer to an already existing virtual media library, without alteration to the existing code. In this way, caching can be provided as a user-selected option.

Turning now to FIG. 3, a flow chart of an example method 300 for virtual media performance improvement is shown.

At step 302, virtual media may be attached at management controller 112. Management controller 112 may allocate cache memory at step 304, and the size of the allocation may depend on the amount of available free memory in some embodiments. At step 306, the size of the cache may be periodically refreshed/changed based on the amount of free memory. At step 312, the allocated cache may be populated (e.g., pre-populated) with some metadata and some initial blocks from the virtual media. For example, depending on the filesystem of the virtual media, any special blocks that are likely to be frequently requested may be loaded into the cache.

At step 308, the virtual media may be attached to the OS of host system 98. For example, the virtual media may be exposed as a USB drive in some embodiments. At step 310, the OS of host system 98 may issue a read request for one or more blocks of the virtual media.

If the requested blocks are present in cache memory at step 314, management controller 112 may immediately respond to host system 98 to service the read request at step 316. At step 318, the cache logic may increment the usage index for the blocks requested.

If the requested blocks are not present in cache memory, management controller 112 may issue a read request to management console 120 at step 320. In some embodiments (e.g., under memory pressure), management controller may remove some old cached data at step 322 to make room for the new data. One of ordinary skill in the art with the benefit of this disclosure will understand that any desired cache eviction strategy may be used.

At steps 324 and 326, management controller may execute some read-ahead logic to pre-load the next few blocks from the virtual media in case they are later needed.

Method 300 may continue in this fashion until the virtual media is disconnected or no longer needed.

One of ordinary skill in the art with the benefit of this disclosure will understand that the preferred initialization point for the methods depicted in FIGS. 2 and 3 and the order of the steps comprising those methods may depend on the implementation chosen. In these and other embodiments, this methods may be implemented as hardware, firmware, software, applications, functions, libraries, or other instructions. Further, although FIGS. 2 and 3 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a host system; and
a management controller configured to provide out-of-band management of the information handling system;
wherein the management controller is configured to:
receive, from a management console coupled to the management controller via a network connection, a request to establish virtual media for the host system;
mount the requested virtual media as a drive accessible to the host system;
receive read requests from the host system for data associated with the mounted drive;
cache data from the virtual media in a local cache such that at least some of the read requests from the host system are for data that is cached in the local cache;
determine one or more filesystem-specific portions of the virtual media that are likely to be requested again; and
prevent eviction of the one or more filesystem-specific portions from the local cache.

2. The information handling system of claim 1, wherein the virtual media is mounted as a virtualized Universal Serial Bus (USB) drive.

3. The information handling system of claim 1, wherein the management controller is further configured to evict data from the local cache based on a likelihood that the evicted data will not be requested again by the host system.

4. The information handling system of claim 3, wherein the management controller is configured to determine a filesystem associated with the virtual media.

5. The information handling system of claim 1, wherein the one or more filesystem-specific portions includes a volume descriptor.

6. The information handling system of claim 1, wherein the local cache is configured to cache an entirety of the virtual media.

7. A method comprising:
in an information handling system comprising a host system and a management controller configured to provide out-of-band management of the information handling system:
the management controller receiving, from a management console coupled to the management controller via a network connection, a request to establish virtual media for the host system;
the management controller mounting the requested virtual media as a drive accessible to the host system;
the management controller receiving read requests from the host system for data associated with the mounted drive;
the management controller caching data from the virtual media in a local cache;
the management controller responding to at least some of the read requests from the host system with data that is cached in the local cache;
the management controller determining one or more filesystem-specific portions of the virtual media that are likely to be requested again; and
the management controller preventing eviction of the one or more filesystem-specific portions from the local cache.

8. The method of claim 7, wherein the local cache comprises random access memory (RAM).

9. The method of claim 7, wherein the local cache comprises non-volatile memory.

10. The method of claim 7, further comprising the management controller evicting data from the local cache based on a likelihood that the evicted data will not be requested again by the host system.

11. The method of claim 10, further comprising:
the management controller determining a filesystem associated with the virtual media.

12. The method of claim 7, wherein the one or more filesystem-specific portions includes a volume descriptor.

13. An article of manufacture comprising a non-transitory, computer-readable medium having computer-executable code thereon that is executable by at least one processor of a management controller of an information handling system for:
receiving, from a management console coupled to the management controller via a network connection, a request to establish virtual media for a host system of the information handling system;
mounting the requested virtual media as a drive accessible to the host system;
receiving read requests from the host system for data associated with the mounted drive;
caching data from the virtual media in a local cache;
responding to at least some of the read requests from the host system with data that is cached in the local cache;
determining one or more filesystem-specific portions of the virtual media that are likely to be requested again; and
preventing eviction of the one or more filesystem-specific portions from the local cache.

14. The article of claim 13, wherein the virtual media is mounted as a virtualized Universal Serial Bus (USB) drive.

15. The article of claim 13, wherein the code is further executable for evicting data from the local cache based on a likelihood that the evicted data will not be requested again by the host system.

16. The article of claim 15, wherein the code is further executable for determining a filesystem associated with the virtual media.

17. The article of claim 13, wherein the one or more filesystem-specific portions includes a volume descriptor.

18. The article of claim 13, wherein the local cache comprises volatile memory.

* * * * *